United States Patent [19]

Sulzer

[11] 4,261,224

[45] Apr. 14, 1981

[54] VALVE ACTUATOR

[75] Inventor: Harry E. Sulzer, Telford, Pa.

[73] Assignee: Anchor/Darling Industries, Inc., Bala-Cynwyd, Pa.

[21] Appl. No.: 952,119

[22] Filed: Oct. 17, 1978

[51] Int. Cl.³ ............................................. F16H 33/18
[52] U.S. Cl. .......................................... 74/626; 64/29; 192/8 R
[58] Field of Search .................. 74/625, 626; 192/8 R

[56] References Cited

U.S. PATENT DOCUMENTS

| | | | |
|---|---|---|---|
| 2,300,023 | 10/1942 | Swartz | 192/8 R |
| 2,597,798 | 5/1952 | Houplain | 192/8 R |
| 2,703,991 | 3/1955 | Kron et al. | 74/625 |
| 2,745,294 | 5/1956 | Kron | 74/625 |
| 4,092,877 | 6/1978 | Ledeen et al. | 74/625 |

Primary Examiner—C. J. Husar
Assistant Examiner—Conrad Berman

[57] ABSTRACT

A valve actuator which is operable alternatively by a motor and manually. The motor is coupled into the drive train for the actuator through a planetary gear device so as to enable rapid actuation of the valve by the motor. The motor is coupled through a special one-way coupling to the sun-gear drive of the planetary assembly which permits the motor to drive the sun gear in either direction upon rotation of the motor but prevents rotation of the sun gear when the motor is arrested. A handwheel is coupled to the ring-gear drive of the planetary assembly through a worm and pinion so that the handwheel may then drive the ring gear under manual operation, but the ring gear is retained against rotation by the worm pinion when the handwheel is idle. The planet-gear drive serves as the normal output of the planetary assembly and is coupled to the valve spindle through a torque-limiting device. A position-limiting means is coupled to the valve spindle to arrest rotation of the motor at the opposite limit positions of the valve element. A torque-limiting sensor is coupled with the ring-gear drive to sense the torque transmitted or fed back through the planetary assembly, said torque-sensing device being adjustable to arrest the drive motor when the motor exceeds the said torque. The setting is independently adjustable for different directions of rotation of the drive motor.

20 Claims, 16 Drawing Figures

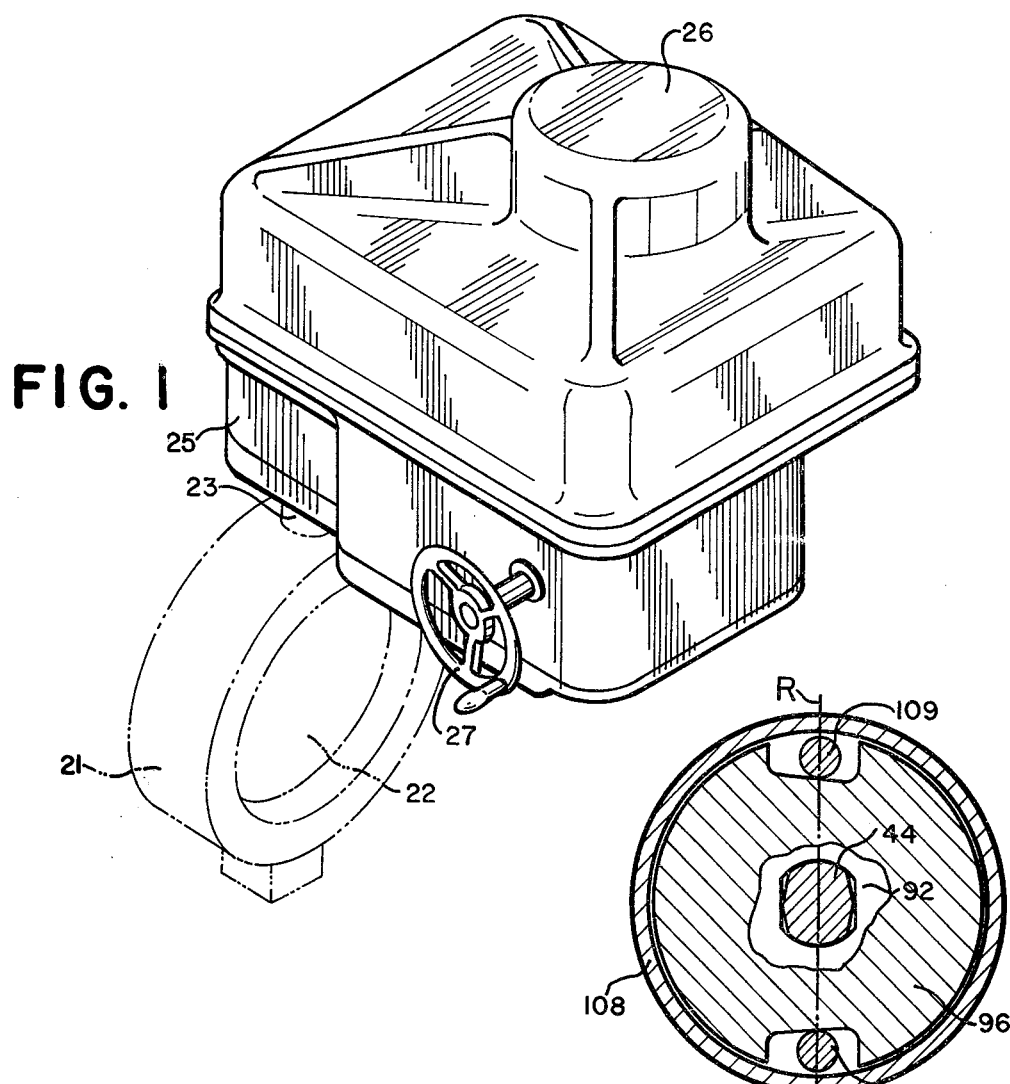
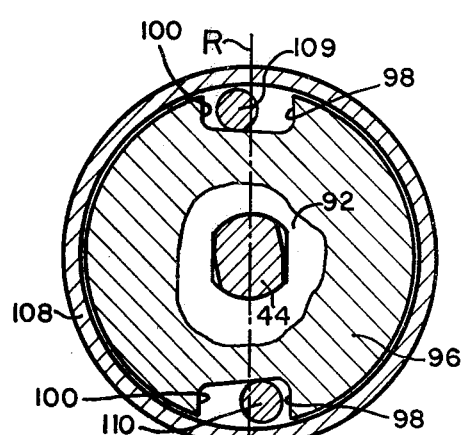
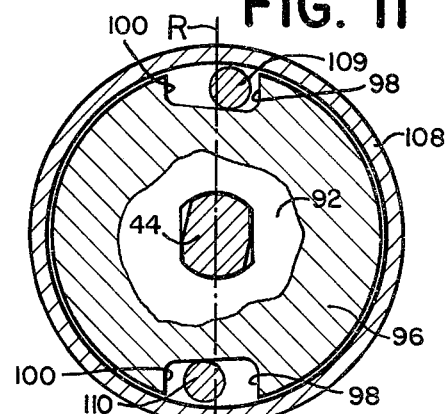

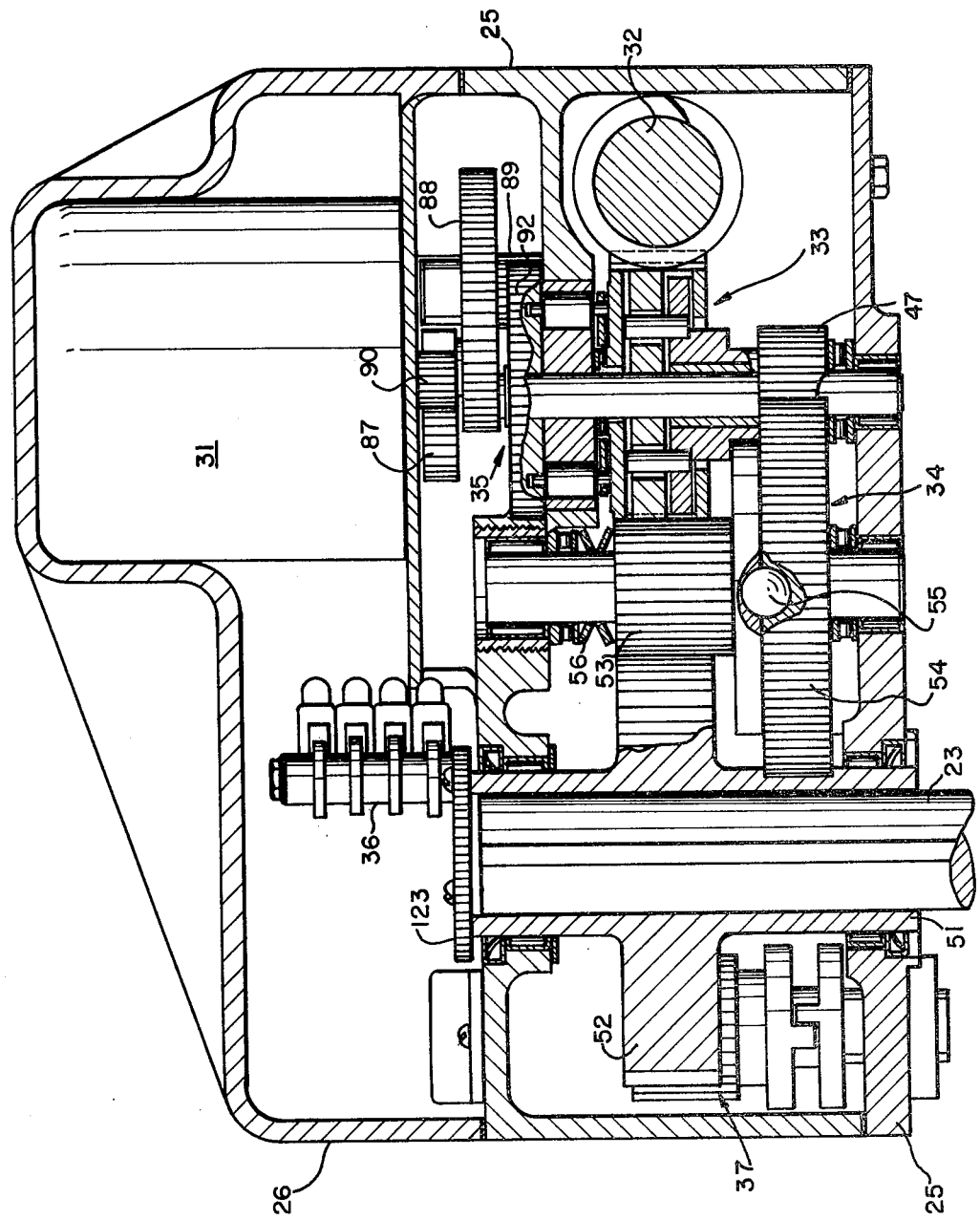

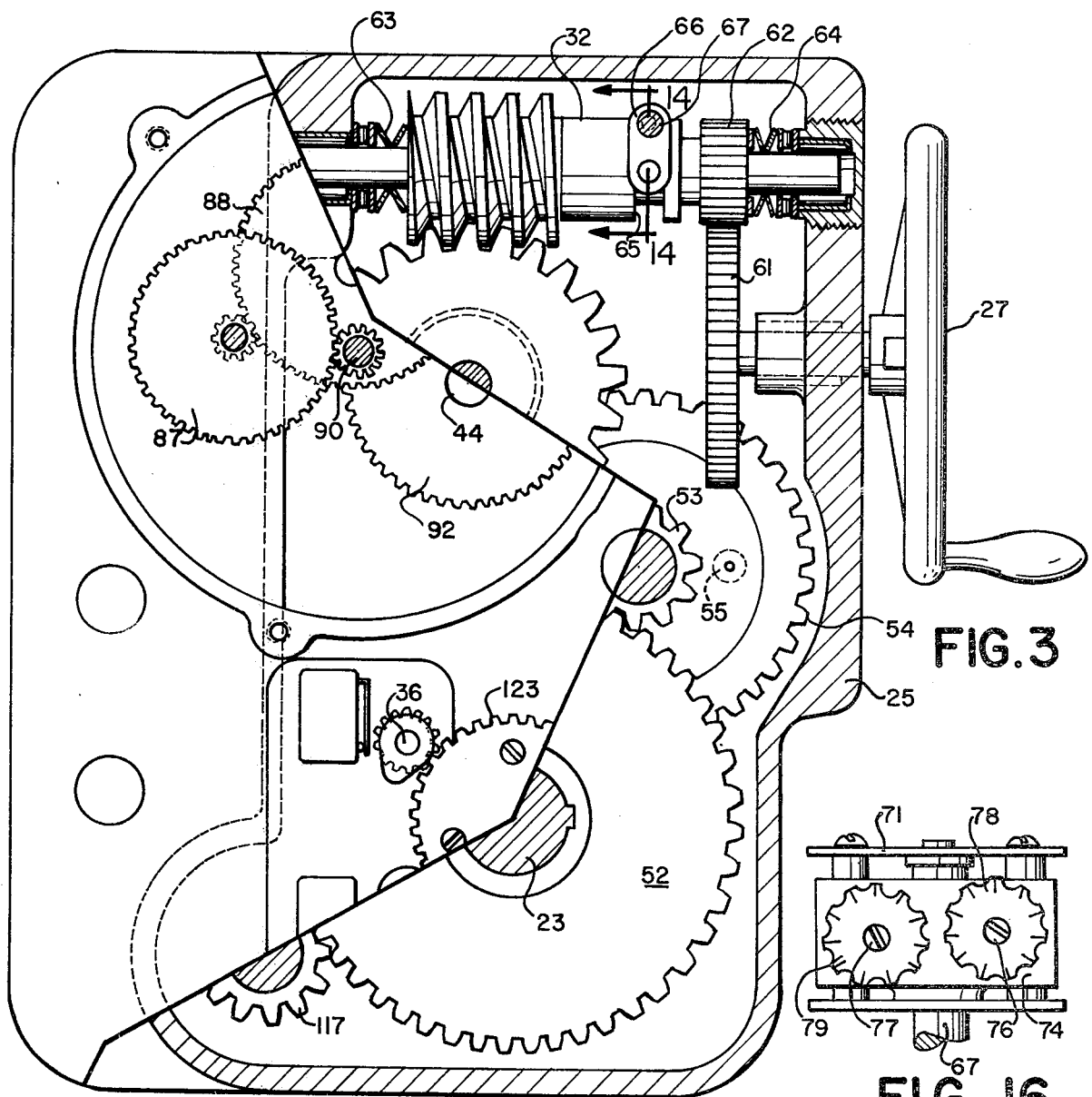
FIG. 3
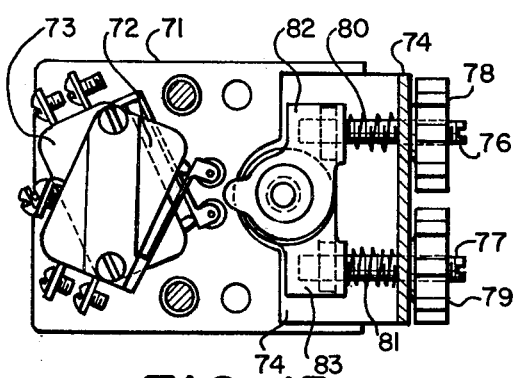
FIG. 15
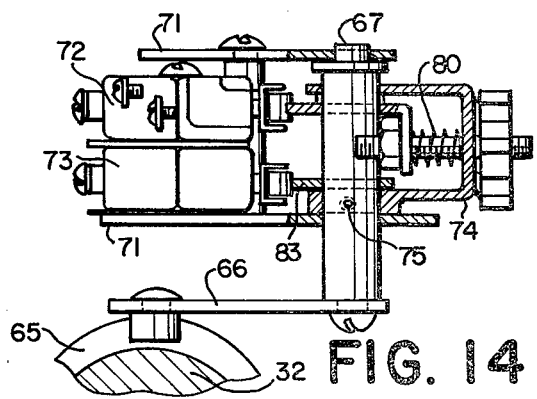
FIG. 16
FIG. 14

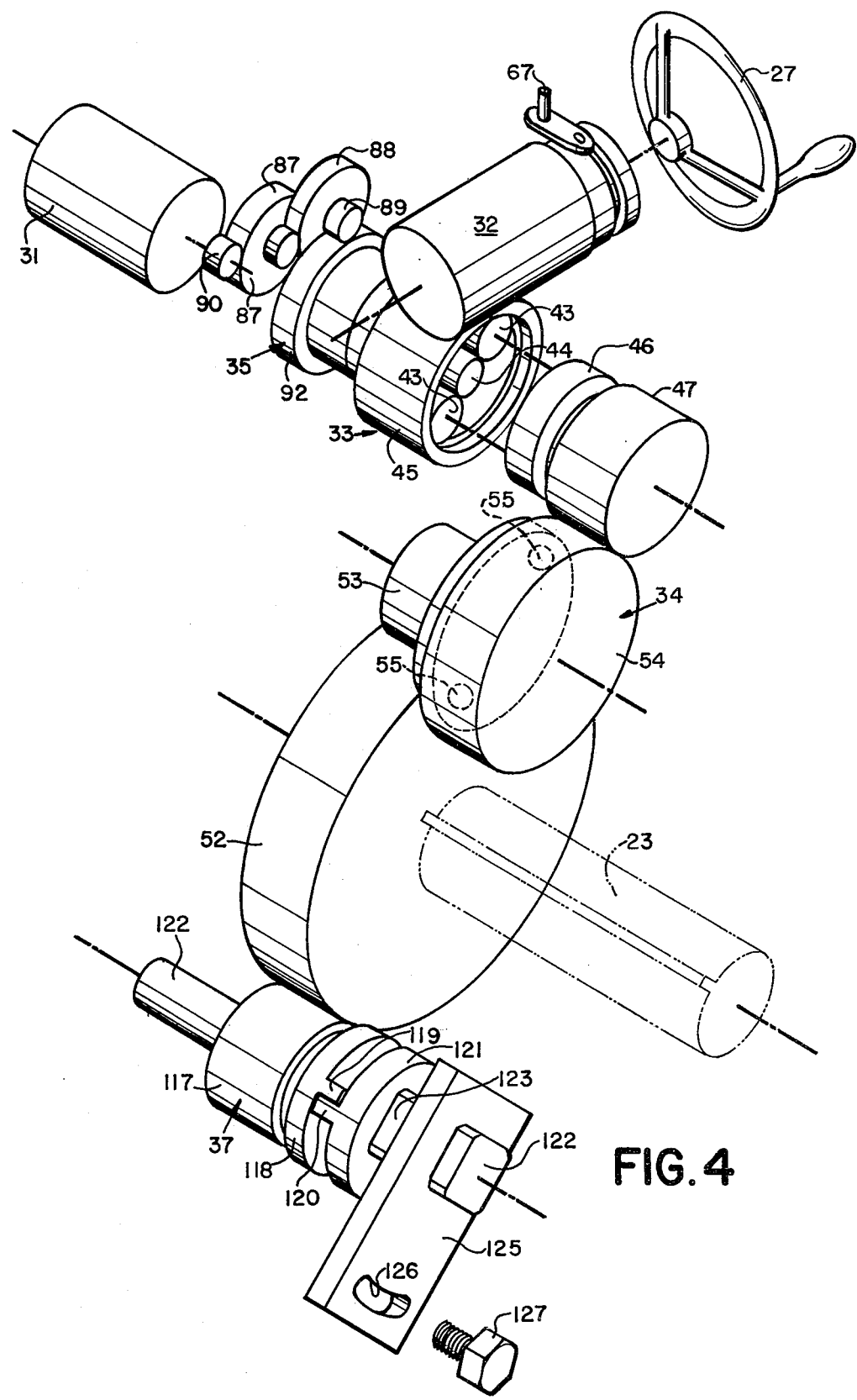

VALVE ACTUATOR

The present invention relates to valve actuators and has particular application to motor-actuated valve actuators which are capable of high-speed opening and closing of the valve.

Prior to the present invention, motor-actuated valve actuators were either capable of high-speed operation, or were capable of precision adjustment as to opening and closing positions of the valve, but not both. If high-speed operation were desired, it was believed necessary to sacrifice the precision setting of the opened and closed positions of the valve; and conversely, if precision setting of the opened and closed positions of the valve were desired, the speed of operation must be sacrificed.

The present invention enables high-speed operation and yet enables precision setting of the opened and closed positions, respectively, of the valve.

Another object of the present invention is to provide a simple and effective valve actuator which is operable both manually and in the motorized mode to provide both an accurate and a speedy operation of the valve between opened and closed positions.

The present invention also provides an improved means for predetermining the opened and closed positions of the valve, which means are adjustable at the site of installation to enable alternative positioning of the valve actuator relative to the valve itself so that the valve actuator may be mounted in different orientations to accommodate the physical space limitations which might be encountered during the installation procedure. Still another object of the present invention is to provide an improved control for the motor-driven actuator which precisely arrests the motor when the torque necessary to operate the valve actuator exceeds a predetermined limit.

More specifically, the present invention provides an improved control device which is adjustable to set the limit torque for valve opening independently of the limit torque setting for valve closing.

More specifically, the present invention provides a valve actuator embodying a planetary gear assembly in which the drive motor is coupled to one of the drives of the planetary gear assembly through an improved one-way coupling and in which a manual operator is coupled to another drive of the planetary gear assembly through a worm and pinion connection whereby the inertia forces applied to the planetary gear assembly are overcome rapidly and precisely to avoid over-travel when either drive is interrupted.

All of the objects of the invention are more fully set forth hereinafter with reference to the accompanying drawings, wherein:

FIG. 1 is a perspective view of the valve actuator, with the valve components shown in broken lines;

FIG. 2 is a vertical section through the valve actuator shown in FIG. 1;

FIG. 3 is a horizontal section through the valve actuator with parts broken away to more clearly illustrate the construction thereof;

FIG. 4 is a schematic view of the gear train embodied in the valve actuator of FIG. 1;

FIG. 11 is a sectional view taken on the irregular section line 11—11 of FIG. 5 showing the relationship between the input plate and the brake rollers;

FIGS. 12 and 13 are views similar to FIG. 11 showing respectively the interaction of the brake rollers between the shoe and rotor upon driving the input plate in opposite directions and upon attempted feed-back rotation of the planetary sun shaft;

FIG. 14 is a fragmentary sectional view taken on the line 14—14 of FIG. 3 showing the torque-sensing means of the present invention;

FIG. 15 is a plan view of the mechanism shown in FIG. 14 with the top element removed and portions broken away to more clearly illustrate its construction; and FIG. 16 is a righthand side elevation of the structure shown in FIG. 14.

Figure 5:
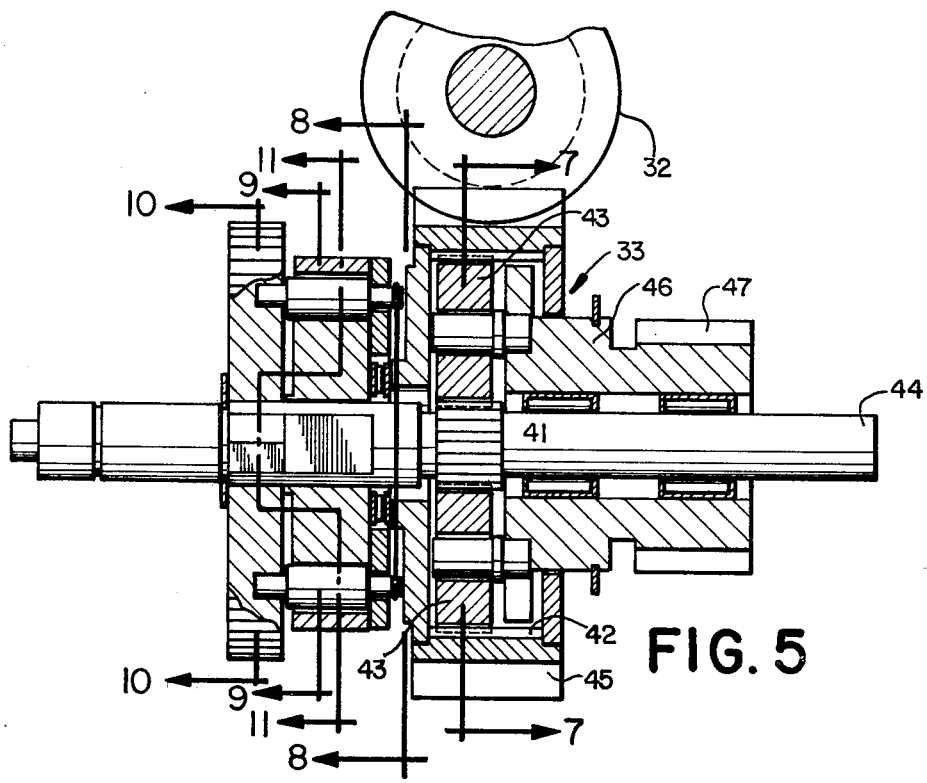
FIG 5 is a sectional view along the planetary gear axis.

The illustrated embodiment of the invention is adapted to actuate a butterfly valve as shown in broken lines in FIG. 1, the valve including an in-line casing 21 having a butterfly valve element 22 mounted for pivotal movement by a stem 23 between an open position parallel to the axis of the valve casing 21 and a closed position transverse thereto. The valve casing 21 is adapted to be mounted in a flow conduit and forms a part thereof. Thus, full movement of the valve between open and closed positions is effected by a 90-degree rotation of the valve stem 23. The actuator casing 25 has a lid with a motor enclosure 26, and a handwheel 27 for manual operation. In FIG. 1, the valve stem 23 is disposed vertically. However, in accordance with the invention, the valve casing 21 may be positioned with the valve stem at any angular position about the axis of the flow conduit, and the actuator casing 25 may be positioned selectively at different angular positions about the axis of the valve stem.

As shown in FIG. 2, the valve actuator consists of a series of gears disposed in a gear train to rotate the valve stem 23 in both directions between opened and closed positions, either by a motor 31 or by the handwheel 27 which is coupled to a worm 32.

In accordance with the invention, the gear train of the valve actuator includes a planetary gear assembly 33. The valve stem 23 (FIG. 4) is coupled to the planetary gear assembly through torque-release gearing 34; the handwheel 27 is coupled to the planetary gear assembly through the worm 32; and the motor 31 is coupled to the assembly through a one-way coupling means 35. Thus, the motor 31 and the handwheel 27 may alternatively drive the valve stem 23. A program switch assembly 36 (FIG. 3) is coupled to the valve stem 23 to permit process control responsive to the angular position of the valve stem. Likewise, a limit-setting 37 (FIG. 4) is coupled to the valve stem to mechanically determine the opposite limit positions of the valve stem.

Figure 7:
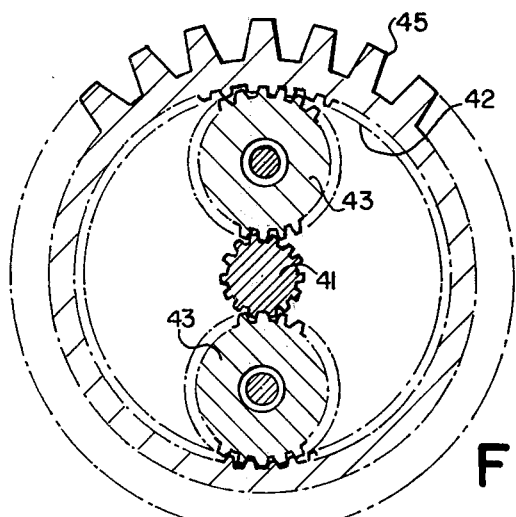
FIG. 7 is a sectional view taken on the line 7—7 of FIG. 5 showing the planetary gears.

The planetary gear assembly 33 is best shown in FIGS. 5 and 7 and includes a sun gear 41, an internal ring gear 42 concentric with the sun gear and a pair of planet gears 43,43 disposed intermediate the sun gear and the ring gear. The sun gear 41 is driven by a sun shaft 44, in the present instance, formed integrally with the gear. The internal ring gear 42 is driven by external teeth 45 forming a pinion which meshes with the worm 32. The planet gears are driven by a yoke 46 having a planet drive gear 47 formed integrally therewith and rotatable on the sun shaft 44. The planetary gear assembly operates in a conventional manner so that when one of its three drives is held stationary, the remaining two drives are operatively interconnected. In this fashion, torque is transmitted through the planetary gear assembly from one of its drives to a second drive when the third drive is held stationary.

The train from the valve stem 23 to the planetary drive gear 47 encompasses a sleeve 51 which is keyed to the valve stem 23 and is provided with an external gear 52 coaxial with the valve stem. The external gear is meshed with the torque-limiting assembly 34 which includes a first pinion 53, a second pinion 54, and detent means 55 releasably interconnecting the two pinions. The detent is spring biased by spring washers 56 pressing the pinion 53 into axial engagement with the pinion 54 to retain the ball of the detent means 55 in position. The confronting surfaces of the pinions 53 and 54 have detents which are axially aligned with one another to form two pairs of registering seats. This torque-limiting connection is effective to interrupt the train when the torque differential is sufficient to overcome the bias of the spring washers 56 and to permit disengagement of the ball from one of its seats in the pinions 53 and 54. The second pinion 54 is meshed with the planet drive gear 47 as shown in FIG. 2.

The handwheel 27 is coupled to the ring drive 45 as best shown in FIG. 3. The shaft of the handwheel 27 carries a gear 61 which meshes with a gear 62 on the worm 32. The worm 32 is rotatably mounted in the casing 25 for limited axial movement which is restrained by spring washers 63 and 64 at the opposite ends of the worm. The worm has a circumferential groove 65 adjacent the gear 62 in which a torque-sensing lever 66 rides. As described more fully hereinafter, axial displacement of the worm 32 pivots the lever 66 on its shaft 67. Rotation of the handwheel 27 thereby rotates the worm 32 and drives the ring drive 45 as shown in FIG. 3. The worm and pinion connection provided by the worm 32 and pinion teeth 45 permits drive from the wheel 27 to the pinion 45, but resists reverse drive from the pinion 45 to the wheel 27. When the drive 45 tends to rotate, it does not cause rotation of the worm 32, but displaces the worm axially against the bias of the springs 63 or the springs 64, depending upon the direction of rotation of the drive pinion 45.

The torque-sensing mechanism is best shown in FIGS. 14-16 and includes an open switch housing 71 which mounts a pair of limit switches 72 and 73, respectively. The upper limit switch 72 is a forward torque limit switch, whereas the lower switch 73 is a reverse torque limit switch. The shaft 67 is pivotally mounted in the housing 71 and carries a U-shaped yoke 74 which is pinned to the shaft as indicated at 75. The yoke 74 mounts a pair of adjusting screws 76 and 77. The adjusting screw 76 sets the forward torque limit, whereas the adjusting screw 77 adjusts the reverse torque limit. The adjustment is effected by adjusting wheels 78 and 79 which cooperate with back-up springs 80 and 81. The screw 76 is anchored in a forward-torque switch operator 82 which is pivotally mounted on the shaft 67 and has an operating lug cooperable with the forward torque switch 72. Adjusting the nut 78 pivots the switch operator 82 on the shaft 67 to predetermine the pivotal displacement required to actuate the switch 72. In like manner, the screw 77 is anchored in a switch operator 83 pivoted on the shaft 67 and having a projecting lug. The lug of the operator 83 cooperates with the switch 73 to determine the reverse-torque sensitivity. The wheel 79 adjusts the pivotal position of the operator 83. Preferably, the adjusting wheels 78 and 79 have a set screw associated with each wheel to lock the same in adjusted position.

From the foregoing description, it is apparent that when the worm wheel 32 is displaced to the left in FIG. 3 to compress the spring 63, the shaft 67 is pivoted clockwise to pivotally displace the york 74 clockwise. The connection through the screw 76 effects a corresponding displacement of the operator 82 to actuate the forward torque limit switch 72. When the worm is displaced axially to the right in FIG. 3 to compress the spring 64, the counterclockwise pivotal movement of the shaft 67 actuates the reverse torque limit switch 73.

Figure 10:
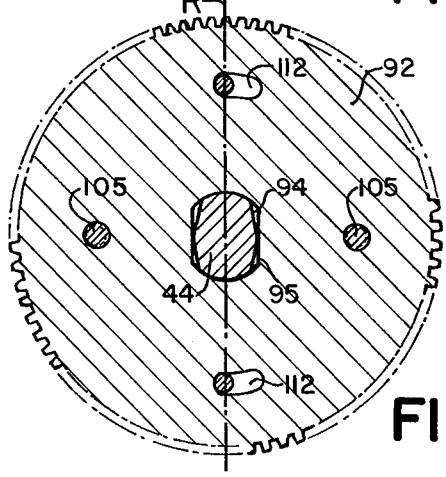
FIG. 10 is a sectional view taken on the line 10—10 of FIG. 5 showing the input plate of the one-way coupling.
Figure 6:
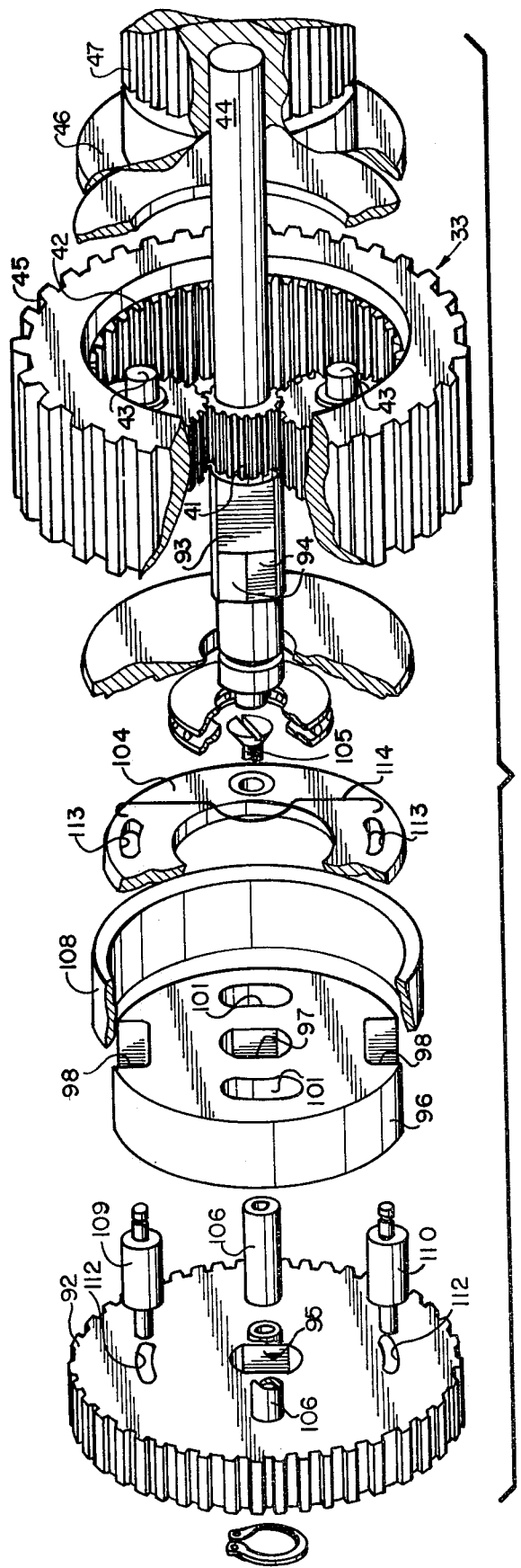
FIG. 6 is an exploded perspective view of the elements shown in FIG. 5.

The motor 31 is coupled to the planetary assembly 33 through the one-way coupling means 35. As shown in FIGS. 2 and 3, the motor 31 is coupled to the coupling 35 by speed-reducing gears 87, 88 and 89, driven by the motor output gear 90. The final gear 89 in the train engages the external peripheral teeth of the input plate 92 of the coupling 35. The input plate 92 is mounted on the upper free end of the sun shaft 44 so as to provide a lost-motion driving connection therebetween. To this end, the shaft 44 is provided with opposite flats 94 (see FIGS. 6, 10 and 11) which are angled inwardly as indicated adjacent the free extremity of the shaft 44. The angular flats 94 engage in a D-hole 95 in the center of the feed plate 92. As shown in FIG. 10, the plate 92 may therefore rotate slightly in either direction before the plate drives the shaft 44, thereby providing a lost-motion connection therebetween. Adjacent the plate 92 a rotor 96 is rigidly mounted on the shaft 44 by a D-hole 97 which fits opposite flats 93 of the shaft provided adjacent the angled flats 94. In this fashion, a rigid connection between the rotor 96 and the shaft 44 is obtained.

Figure 9:
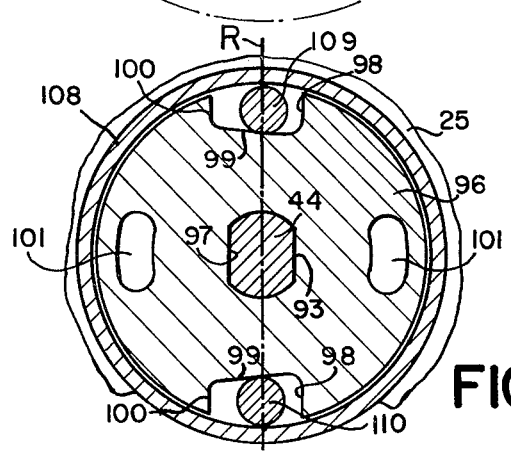
FIG. 9 is a sectional view taken on the line 9—9 of FIG. 5 showing the rotor, shoe and brake rollers of the one-way coupling.

As shown in FIG. 9, the rotor 96 has off-center cutouts 98,98 at diagonally opposite sides thereof, each providing a ramp 99 transverse to the radial axis of the rotor. As shown in FIG. 9, the notches 98 are both off center to the left of the rotor radial axis R so that they provide a narrow end 100 to the left of the rotor radial axis R in FIG. 9. The opposite end of the ramp is wider in radial extent. Space 90° from the ramps 99, the rotor is provided with enlarged passageways or openings 101,101. The rotor is retained against the input plate 92 by a retainer plate 104 which is fastened to the input plate 92 by through-screws 105 and spacers 106 passing through the enlarged openings 101 and threaded into the input plate 92 as shown in FIG. 10. By reason of the lost-motion connection provided by the angled flats 94 and the D-slot 95, and the tight fit of the flat 93 (FIG. 6) of the shaft 44 with the D-slot 97, the rotor 96 and the shaft 44 may rotate relative to the input plate 92, to the degree provided by the lost motion. The rotor is circumscribed by a cylindrical shoe 108 (FIG. 6) which is anchored in the frame 25 concentric with the shaft 44. The rotor is rotatable within the shoe 108 when it is driven by the input plate 92.

Figure 8:
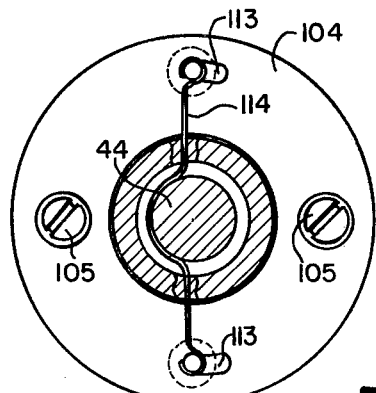
FIG. 8 is a sectional view taken on the line 8—8 of FIG. 5 showing the spring actuator component of the one-way coupling to the sun gear of the planetary.

In accordance with the invention, the rotor 96 is locked within the shoe 108 upon arrest of the input plate 92. To this end, as shown in FIG. 9, rollers are mounted in the cutouts 98 with a diameter sufficient to provide clearance between the roller and the shoe when the roller is on the radial axis R of the rotor at the wide end of the ramp 99. Stated differently, the roller diameter is less than the space between the ramp 99 and the shoe 108 at the wide end 98 but is greater than the space between the ramp 99 and the shoe 108 at the narrow end 100. The upper roller is designated a forward brake roller 109 and the lower roller is designated a reverse brake roller 110. The ends of the roller are journalled in arcuate slots 112 (FIG. 10) and 113 (FIG. 8) in the input plate and retainer plate, respectively. As best shown in FIGS. 8 and 10, the slots 112 and 113 both extend rightward from the radial axis R of the shaft 44. A spring-actuator 114 spans between the rollers 109 and 110 and bears in the middle against the shaft 44 to urge both rollers toward the end of the slots 112 and 113 which are coincident with the radial axis R of the shaft 44 as shown in FIG. 8. This construction provides a one-way coupling which permits the input plate 92 to drive the shaft 44 in either the forward or the reverse direction when the lost motion is taken up. However, when the plate 92 is stationary, rotation of the shaft 44 is arrested by engagement of one of the rollers at the narrow end of the ramp to interlock the rotor 96 with the shoe 108 and prevent rotation of the rotor 96 and thereby the shaft 44.

In operation, for example, referring to FIGS. 8-13, when the motor 31 is energized to drive the input plate 92 forward (clockwise), the forward rotation of the input plate, as shown in FIG. 8, shifts the forward brake roller 109 to the right and frees the reverse brake roller 110 for displacement to the left under the influence of the spring actuator 114. As shown in FIG. 13, the rightward movement of the forward brake roller 109 causes it to travel down the forward ramp 99 toward the wide end and urges the reverse roller 110 up the reverse ramp 99 toward the narrow end 100. At the wide end, the forward roller has clearance, but at the narrow end, the reverse roller 110 would tend to lock between the ramp and the shoe to block counterclockwise movement of the rotor 96 in the shoe 108. However, since upon completion of the lost motion, the drive plate 92 directly drives the output shaft of the coupling (i.e. the sun shaft 44 of the planetary assembly 33) in a clockwise direction, the rotor 96 is rotated clockwise in a forward direction which is permitted by the reverse brake roller 110.

When the input plate 92 is driven in the reverse direction, as shown in FIGS. 8 and 10, the counterclockwise rotation of the plate 92 drives the reverse brake roller 110 to the right toward the wide end and permits the forward brake roller 109 to be displaced towards the left toward the narrow end by the spring actuator 114. As shown in FIG. 12, these functions cause the forward brake roller 109 to travel up the forward brake ramp 99 to the narrow end 100 where it tends to lock and the reverse brake roller 110 to travel down the ramp 99 toward the large end where it has clearance, thus tending to resist clockwise rotation of the rotor 96, but to permit counterclockwise rotation. At the end of the lost motion, the continued reverse rotation of the input plate 92 rotates the coupling output shaft 44 to rotate the rotor 96 in the reverse direction counterclockwise, which is permitted in spite of the forward brake roller 109 being urged toward locking position at the narrow end 100 of its ramp.

However, when the input plate 92 is not driven and is held against rotation, the one-way coupling is effective to arrest rotary movement of the sun shaft 44. In this mode of operation, if the sun shaft 44 tries to rotate forwardly, clockwise as shown in FIG. 12, with the lost motion of the plate 92, the rollers tend to stay in the position of FIG. 9. Rotation of the shaft 44 in a clockwise forward mode displaces the ramp 99 under the forward brake roller 109 so that the roller 109 moves up the ramp towards the narrow end 100 and engages firmly with the shoe 108. This firm locking engagement of the roller 109 between the shoe 108 and the ramp 99 effectively locks the rotor 96 against further movement, thereby braking or locking the rotation of the shaft 44 until such time as the input plate 92 is driven.

By the same token, if the shaft 44 is driven in the reverse direction with the plate 92 stationary, the counterclockwise movement of the rotor 96 moves the ramp 99 under the reverse brake roller 110 to confine or lock the roller 110 between the shoe 108 and the ramp 99 at the narrow end 100 of the ramp, thereby effectively braking further reverse rotation of the shaft 44 and the rotor 96. This braking action remains effective until the plate 92 is driven in either the forward or the reverse directions.

The direct, in-line drive from the motor 31 through the planetary gear assembly 33 to the valve stem 23 enables the valve stem to be operated at a high speed, consistent with the ability of the butterfly valve element 22 to open or close in the passageway provided by the valve casing 21. In the event of resistance, as for example, caused by a blockage of the motion of the valve stem, the resistance to rotation of the valve stem is transmitted backwardly as a counter-torque. This counter-torque is fed back through the torque release gearing 34 to the planet drive of the planetary gear assembly. If the fedback torque is greater than that which can be transmitted by the torque-release coupling 34, the coupling will release and prevent overloading of the valve stem. Furthermore, prior to activation of the torque-release, the fedback torque, fed back past the torque release gearing 34, is transmitted to the planet drive of the planetary gear assembly. The torque fed back through this assembly will thereupon resist rotation of the planet gears and will impart a greater torque to the ring gear which is held stationary by the worm. The torque applied to the ring gear is converted to axial movement of the worm 32 against the bias of the spring 63 or the spring 64. The movement is sensed by the sensor lever 66 and is converted to an electrical switch signal by the switch 72 or 73. This signal will arrest the drive motor 31 and actuate an alarm to indicate a malfunction or the like. Since the dangers associated with a malfunction of the valve are different in the opening and closing mode, respectively, the present invention enables the torque sensor switches 72 and 73 to be actuated at different levels or fedback torque.

The torque sensors are also used to deactivate the motor 31 when the valve attains its fully opened or fully closed position. The present invention enables the fully opened and fully closed position to be set accurately mechanically adjacent the valve and permits adjustment of the pre-set limits after the valve leaves the factory and is at the installation site.

The mechanism 37 for determining the opposite limit positions of the valve element 22 is best shown in FIGS.

2, 3 and 4. As shown, the limit-setting mechanism 37 comprises a follower gear 117 meshed with the external gear 52. The gear ratio is such that the follower gear 117 makes one complete revolution between the respective opened and closed positions of the stem 23. The follower gear 117 carries a first stop plate 118 having a depending lug 119 thereon. The lug 119 cooperates with an upstanding abutment 120 on a second stop plate 121 which is mounted coaxial with the first stop plate 118. The follower 117 and the first stop plate 118 are freely rotatable on the shaft 122 but the second stop plate 121 is fixed against rotation on the shaft by reason of the lower end of the shaft being squared as shown at 123. As shown in FIG. 2, the shaft 122 projects downwardly through the casing 25 which is provided with a rotatable bushing to permit rotation of the squared shaft 123 therein. The squared shaft is rotatably positioned in the casing 25 by a positioning lever 125 which is adjustably anchored in the casing by an arcuate slot-and-screw connection 126 and 127, respectively.

The length of the arcuate slot 126 is sufficient to afford sufficient angular adjustment to enable the opposite limit positions of the valve, as determined by the forward and reverse engagement of the lug 119 with the abutment 120 to be adjusted to the desired extent. For example, the length of the slot may provide a 45° adjustment of the shaft 122. This permits a fine adjustment of the angular position of the shaft 122 over a 45° range. A coarse adjustment of the shaft is also enabled by the illustrated construction. To this end, the adjusting lever 125 may be completely disengaged from the square end of the shaft so that the shaft may be rotated through any number of 90° intervals, after which the lever 125 is re-engaged with the shaft and the stop position is thereby altered by rotation of the shaft 122 which may correspond to a substantially greater angular adjustment of the limit positions of the stem 23.

The mechanical stop provided by the lug 119 and abutment 120 assures the arrest of the valve element precisely at the fully opened and fully closed positions. This precise arrest of the valve element is assured since the engagement of the lug 119 with the abutment 120 provides a mechanical arrest of the external gear 52. The mechanical arrest of the gear 52 is fed back through the gear train to the planetary assembly 33 where the torque-sensing device is effective to deenergize the motor 31. Deenergizing the motor stops the input plate 92 and the one-way coupling locks the system against backlash or further rotation. As shown in FIGS. 2 and 3, the program switch assembly 36 is coupled to the valve stem 23 by a program gear 123. The program switches include components which will deactivate the alarm which would otherwise be triggered by the torque-sensing mechanism when the valve actuator is functioning normally to open and close the valve.

The foregoing description has been made in connection with the rotation of a butterfly valve element between open and closed positions and 90° to one another. The present invention is equally applicable to other valve types, including gate valves, barrel valves and the like. In accommodating the mechanism to different valve types, the stop mechanism is designed at the factory to provide rotation of the valve stem or other valve actuator the desired angular distance between open and closed positions. The torque release coupling 34 may be adjusted to different torques by substitution of differing spring elements 56 and the torque-sensing mechanism is likewise capable of being designed for different torques by substitution of different spring elements 63 and 64 and adjustment of the wheels 78 and 79.

Thus, the basic design of the actuator is capable of widespread utilization without substantial modification of the unit's structure. The straight-through drive from the motor to the valve stem affords rapid and positive actuation of the valve stem by the motor and the construction of the present invention assures prompt and precise arrest of the valve stem according to the specified requirements.

While a particular embodiment of the present invention has been herein illustrated and described, it is not intended to limit the invention to such disclosure, but changes and modifications may be made therein and thereto within the scope of the following claims.

I claim:

1. A motor-actuated valve actuator having a manual override comprising a reversible drive motor, a handwheel, an output device coupled to the operator of the valve to displace the same, a planetary gear assembly having a planet drive means, a ring drive means and a sun drive means, a first of said drive means being connected to said motor, a second of said drive means connected to the handwheel, and the third of said drive means being connected to the output device, a one-way coupling in the motor connection to said first drive means, said coupling being operative to rotate its associated first drive means in either direction upon actuation of said motor to effect rotation of said first drive means in the corresponding direction, and to lock said first drive means against rotation when said motor is not actuated, said handwheel connection being operative to rotate said second drive means in either direction upon actuation of said handwheel in the corresponding direction and to lock said second drive means against rotation when said handwheel is stationary, whereby selective actuation of either said drive motor or said handwheel is effective to drive said third drive means and thereby the output device.

2. An actuator according to claim 1 wherein said output connection to said third drive means includes torque-release gearing operable upon application of a given torque, said gearing being effective to interrupt operation of the connection of the third drive means to the output device of said actuator.

3. An actuator according to claim 1 wherein said handwheel connection includes a worm coupled to said handwheel and a pinion coupled to said second drive means, means mounting said worm for axial displacement away from a center position, and spring means biasing said worm toward said center position, so that the worm is displaced against said bias in response to the application of torque by said second drive means to said pinion.

4. An actuator according to claim 3 including a torque-sensing lever responsive to displacement of said worm to interrupt the operation of the actuator.

5. An actuator according to claim 4 wherein said torque sensing lever is mounted on a shaft for pivotal displacement with said shaft about the shaft axis, said shaft having a pair of switch operators mounted thereon, said actuator including separate forward and reverse torque-sensing switches each responsive to pivotal displacement of one of said operators.

6. An actuator according to claim 5 including means to adjust each switch operator on said shaft independently of the other to enable separate adjustment of the torque-sensitivity of said switches for forward and reverse torque, respectively.

7. An actuator according to claim 1 wherein said output device includes a gear, and limit-setting means coupled to said gear to predetermine the opposite limit positions of said valve operator.

8. An actuator according to claim 7 wherein said limit-setting means includes a limit gear meshed with said output gear, a shaft rotatably mounting said limit gear, an abutment means fixedly mounted on said shaft, a lug on said limit gear adapted to engage said abutment means at opposite ends of its pivotal movement on said shaft to limit the rotation of said limit gear to a predetermined angular distance.

9. An actuator according to claim 8 including means to adjust the angular position of said shaft and thereby said abutment means to thereby enable adjustment of the location of the opposite limit positions at the ends of said angular distance.

10. An actuator according to claim 9 wherein said shaft is mounted for rotation adjacent said valve operator and said adjusting means includes a lever fixed to said shaft to anchor it at a predetermined position against rotation.

11. An actuator according to claim 10 wherein said lever is adjustably mounted on said shaft to permit rotation of said shaft and adjustment of said predetermined position.

12. An actuator according to claim 1 wherein said one-way coupling comprises an input plate connected to said drive motor and an output shaft connected to said first drive means, a driving connection between said input plate and said shaft, a rotor driven by said output shaft and having a pair of cutouts in its periphery forming ramps, a stationary shoe surrounding said rotor, a roller mounted in each cutout between said shoe and the ramp of said cutout, said cutouts having a wide end of greater radial width than said rollers and a narrow end of less radial width than said rollers, the narrow ends of said cutouts both being disposed on the same side of an imaginary line in said rotor passing through said cutouts, and the wide ends being disposed on the opposite side of said line, and means mounting said rollers for displacement of one of said rollers when said shaft is driven by said second drive means, said one roller engaging between said ramp and said shoe to block rotor rotation in the direction of drive by said second drive means, said mounting means also being operative to displace said one roller when said input plate is driven in the opposite direction by said drive motor, said one roller engaging between said ramp and said shoe but permitting rotor rotation in said opposite direction.

13. An actuator according to claim 12 wherein said input plate has peripheral gear teeth, and said connection to said drive motor comprises step-down gearing between said drive motor and said peripheral gear teeth.

14. An actuator according to claim 12 wherein said cutouts are diagonally opposite on said rotor, and said imaginary line through said cutouts is coincident with a radial axis of said rotor.

15. An actuator according to claim 14 including a leaf-spring means bearing against the rollers at its opposite ends and bearing against the output shaft intermediate said ends.

16. An actuator according to claim 12 wherein said roller mounting means comprises arcuate slots in said input plate, and lost-motion means in the driving connections between said input plate and said rotor to achieve said selective displacement of said rollers upon application of driving force from said input plate and said output shaft.

17. An actuator according to claim 16 wherein said input plate is mounted on said output shaft with a lost-motion drive connection and said rotor is fixedly mounted on said output shaft.

18. An actuator according to claim 17 wherein said lost motion drive connection comprises a D-slot in said input plate and angularly-disposed flats on said output shaft enabling said D-slot to rotate relative to said shaft prior to driving the same.

19. A one-way coupling comprises an input plate and an output shaft, a driving connection between said input plate and said shaft, a rotor driven by said output shaft and having a pair of cutouts in its periphery forming ramps, a stationary shoe surrounding said rotor, rollers mounted in said cutouts between said shoe and said ramp, said cutouts having a wide end of greater radial width than said rollers and a narrow end of less radial width than said rollers, the narrow ends of said cutouts both being disposed on the same side of an imaginary line in said rotor passing through said cutouts, and the wide ends both being disposed on the opposite side of said line, and mounting means affording displacement of said rollers when said shaft is driven independently of said drive plate, said one roller engaging between said ramp and said shoe to block rotor rotation in the direction of said independent drive, said mounting means also being operative to afford displacment of said one roller when said input plate is driven in the opposite direction, said one roller engaging between said ramp and said shoe but permitting rotor rotation in said opposite direction.

20. A coupling according to claim 19 wherein said cutouts are disposed diagonally opposite to one another, said imaginary line being coincident with a radial axis of said rotor, said rollers being centered on said axis by a spring actuator when said coupling is idle and said rollers are at the wide ends of said cutouts.

* * * * *

UNITED STATES PATENT AND TRADEMARK OFFICE
CERTIFICATE OF CORRECTION

PATENT NO. : 4,261,224
DATED : April 14, 1981
INVENTOR(S) : Harry E. Sulzer

It is certified that error appears in the above-identified patent and that said Letters Patent are hereby corrected as shown below:

Column 2, line 64, after "limit setting" insert --means--.
Column 3, line 10, after "when" insert --any--.
Column 4, line 17 "york" should read --yoke--.
Claim, 19, column 10, line 44, "displacment" should read --displacement--.

Signed and Sealed this

Eighth Day of September 1981

[SEAL]

Attest:

GERALD J. MOSSINGHOFF

Attesting Officer        Commissioner of Patents and Trademarks